May 4, 1954  C. E. CRAWFORD  2,677,387
GUIDED FLEXIBLE VALVE
Filed Feb. 19, 1949
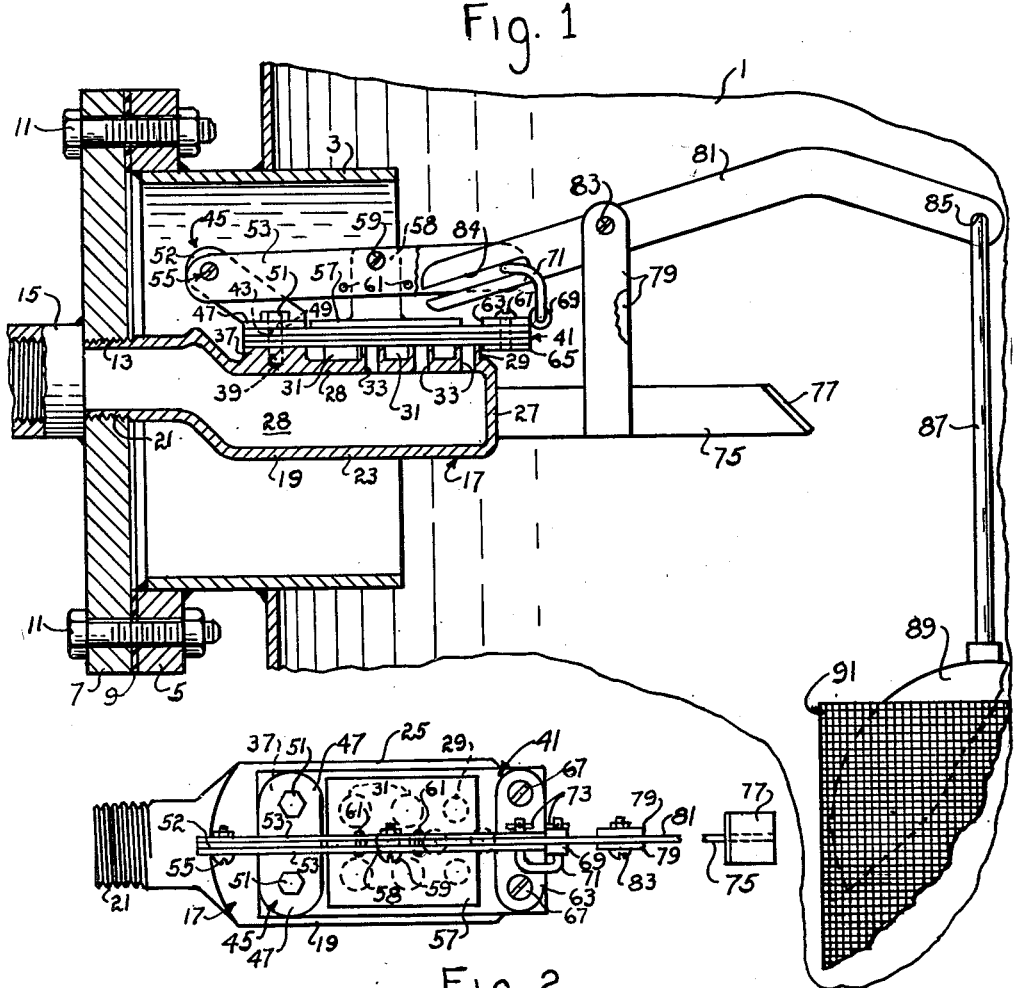
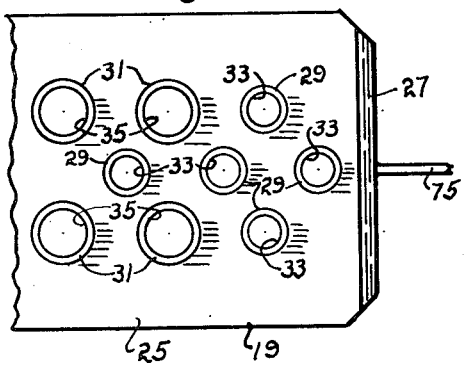
CARLOS E. CRAWFORD
INVENTOR.
BY Edmund W. E. Kamm
ATTORNEY Patented May 4, 1954

2,677,387

UNITED STATES PATENT OFFICE 2,677,387

GUIDED FLEXIBLE VALVE

Carlos Everette Crawford, Wichita Falls, Tex.

Application February 19, 1949, Serial No. 77,387

12 Claims. (Cl. 137—202)

This invention relates to a type of valve which is adapted to open easily against pressure which tends to close it. More specifically, it relates to a "peel off" valve of the type disclosed in Patent No. 2,216,000, issued to C. E. Crawford, September 24, 1940.

In the valve disclosed by Crawford, an arcuate shoe is attached at the free end of a flexible valve and a float attached to the shoe rolls it along the valve to "peel" the valve from the seat. The fluid pressure on the valve is relied upon to seat the valve.

One of the objects of the invention is to provide means for positively seating the valve upon closure.

Another object is to provide adequate means for supporting the float against erratic movement which might result in damage thereto.

Still another object of the invention is to provide a valve operating linkage which gives the float a greater mechanical advantage in the opening and closing positions than in any other position.

A further object of the invention is to provide a valve which can be easily replaced.

Yet another object is to provide a valve which can be readily inserted in a tank.

Another object of the invention is to provide means for guiding the valve and for returning it to and retaining it in proper relation to the ports.

Still another object is to provide means for limiting the travel of the float.

Yet another object is to provide a valve that is simple in construction.

These and other objects will become apparent from a sudy of the specifications and the drawings which are attached hereto and made a part hereof, and in which:

Figure 1 is a side elevation of the valve, partially in section, showing the valve, the float and the actuating lever mounted in a tank.

Figure 2 is a plan view of the valve.

Figure 3 is a plan view of the valve ports.

Referring to Figure 1 of the drawings, the numeral 1 indicates a pressure tank having an outlet pipe 3 fitted with a flange 5. A cover plate 7 is held on the flange against a gasket 9 by bolts 11. An opening 13 is formed in the plate and is tapped for pipe from the inner side. A half pipe coupling 15 is welded to the flange on the outside concentric with the opening.

The valve assembly 17 has a hollow body 19 having a threaded end 21 which is screwed into the opening 13. The body, with the exception of the end 21, has a substantially semi-circular cross-section 23 closed at the top by a wall 25 and at the end opposite the threaded end 21 by a wall 27 to form a chamber 28.

A plurality of circular bosses 29 and 31, the latter of larger diameter than the former, project upward from the wall 25 and are arranged substantially in the pattern shown in Figure 3. The reason for the arrangement will be explained below. Ports 33 and 35 extend downward through the bosses and communicate with the chamber 28. A rectangular boss 37 rises upward from the wall 25 near the junction of the threaded end 21 and the semi-circular section 23 to a level that is flush with the top of bosses 29 and 31 and extends substantially across the wall. Two blind holes 39 are drilled and tapped from the top of the boss.

A rectangular piece of resilient material, such as fabric reinforced rubber, forms the valve 41. The valve has holes 43 spaced at one end to match holes 39.

A bracket 45 has a base portion 47 with holes 49 spaced to match holes 39 and 43 and screws 51 clamp the valve to the boss 37. The lower surface of the valve rests on the top of bosses 29 and 31. The bracket has an arm 52 extending upward and toward the threaded end 21 with a hole in the free end.

Parallel levers 53 comprising parallel, closely spaced, coextensive elements which lie on either side of the arm 52 and a screw 55 passes through a hole in each of the elements and the hole in the projection to form a fulcrum for the levers. A pressing member comprises a flat surfaced shoe or foot 57 which is adapted to bear upon the top of the valve and a leg 58 projecting upward therefrom is pivoted between the levers 53 on screw 59. Pins 61 extend through the levers on either side of the leg to limit the pivoting movement thereof.

The movable end of the valve is clamped between an upper plate 63 and a lower plate 65 fastened together by screws 67 which engage threads in the lower plate. The upper plate has a horizontal pivot boss 69 projecting out beyond the end of the valve. The boss pivotally supports one arm of a U-shaped link 71 which has its other arm pivotally mounted in holes in the free end of the levers 53. Cotter pins 73 are passed through holes in the end of each arm of the link to hold it in assembled position.

A flat bar 75 is welded to end wall 27 of the valve body 19 and projects horizontally into the tank. A stop 77 is welded to the end of the bar facing upward at approximately a 45 degree angle.

Fixed to the bar 75 at a point intermediate the ends and on both sides thereof are posts 79 which extend upwardly. A screw 83 is passed through the upper ends thereof to form a pivot for the lever 81.

One end of the lever 81 projects over the movable end of the valve 41 and is provided with a longitudinal notch 84. The lever is entered between the levers 53 and the notch engages the link 71. The opposite end of the lever is bent downward and has a hole 85 through which is passed the upper end of the float rod 87. A float 89 is suspended from the rod within a cage 91 made of screen or perforated sheet metal and supported in the tank by suitable means not shown.

*Operation*

The valve is shown in the drawings, for purposes of illustration, as a gas vent valve. In such capacity it will be seen that as the liquid level in the tank drops due to the accumulation of gas, float 89 will drop, will rotate lever 81 clockwise which in turn rotates levers 53 in a counter-clockwise direction about 55 to lift the presser mechanism 57—58.

At the same time link 71 is lifted and the end portion of the valve 41 follows and is peeled away, gradually from the foremost boss 29. Since the opening 33 therein is relatively small, the weight of the float mechanism is sufficient to peel the valve even against the differential pressure.

If the float sinks farther, the two intermediate bosses will be reached and their ports opened, and so forth until the valve is wide open, or until it is open wide enough to halt further depression of the liquid level.

Each time a port is opened, the differential pressure across the valve is reduced so that a larger port can be opened by the weight of the float mechanism. This accounts for the initially opened ports being small. It will also be seen that the leverage of the float is high when the valve is closed and decreases as it opens and as the pressures become balanced.

Should the liquid level continue to drop after the valve is wide open, the lever 81 will come to rest upon stop 77 to prevent damage to the valve or other parts.

The presser foot is raised from the valve as the latter is peeled back. It pivots on 59 to align itself with the tops of bosses 29, 31 as the valve is closed and when the float is fully raised the foot bears on the valve to force it against the bosses to prevent leakage.

It will be seen that to install another valve 41 it is necessary merely to remove screws 51 and 67 and substitute a new one.

If the valve is inverted and disposed near the bottom of the tank it can be used as a liquid control valve. The operation is the same as set forth above except that it will be opened by a rising level of liquid and closed by a falling level.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a gas separator, the combination of a pressure tank, a valve body mounted on the tank having a discharge chamber communicating with the exterior of the tank and comprising a wall, port means in said wall communicating with said chamber, a flexible valve having one end fixedly mounted adjacent one end of said wall and having a movable end extending over said port means, a lever pivotally mounted at one end adjacent the mounting of said valve and extending substantially parallel thereto but spaced from the valve, a presser member, having an area sufficient to cover said port means disposed in contact with the valve in the region of the port means when the valve is closed, said presser member being mounted on said lever over said valve and port means, means connecting the other end of said lever to the movable end of the valve and means for actuating said lever to lift the pressure member and peel the valve from the port means.

2. In a gas separator, the combination of a pressure tank, a tube extending into the tank, a cover removably mounted on the tube, a tubular valve body mounted on the cover substantially coaxial with the tube, said body having a chamber communicating with the exterior of the tank and comprising a wall, port means in said wall communicating with said chamber, a flexible valve having one end fixedly mounted on the body adjacent one end of said chamber having a movable end and extending substantially parallel to the axis of the tube and in sealing relation over said port means, a lever pivotally mounted at one end adjacent the mounting of said valve and extending substantially parallel to and closely adjacent the valve, means connecting the lever to the movable end of the valve and means extending substantially parallel to said axis and connected to said lever for actuating it, said body, ports, valve, lever and actuating means being disposed closely adjacent said axis so as to be insertable as a unit through said tube.

3. In a valve mechanism, the combination of a valve body having a discharge chamber, said chamber having a wall, port means in said wall, a flexible valve, means for rigidly fixing one end of the valve to the body so as to position the valve to control the port means, the other end of said valve being movable relative to the body to open and close the port means, valve actuating means mounted on the body, means connecting said actuating means with said other end of the valve, said actuating and connecting means being movable to valve opening and valve closing positions, a presser means, means connecting said presser means to the actuating means to support the said presser means in superposed relation adjacent said valve and ports and to move said presser means toward and away from the valve and ports, said actuating and connecting means when moving to the valve closing position serving to close the valve on said port means and to force the presser means against the valve and the valve against the port means, and when moving toward valve opening position to lift said presser means from the valve and to peel said valve progressively from the port means.

4. In a valve mechanism, the combination of a valve body having a discharge chamber, said chamber having a wall, port means in said wall, a flexible valve, means for rigidly fixing one end of the valve to the body so as to position the valve to control the port means, the other end of said valve being movable relative to the body to open and close the port means, valve actuating means mounted on the body, means connecting said actuating means with said other end of the valve, said actuating and connecting means being movable to valve opening and valve closing positions, a presser means, means connecting said presser means to the actuating means to support the latter in superposed relation adjacent said valve and ports and to move said presser means toward and away from the valve and ports, said actuating and connecting means when moving to the valve closing position serving to close the valve on said port means and to force the presser means against the valve and the valve against the port means and to hold them in such positions, and when moving toward valve opening position to lift said presser means from the valve and to peel said valve progressively from the port means.

5. In a valve mechanism, the combination of a valve body having a discharge chamber and comprising a wall, port means in said wall communicating with said chamber, a flexible valve, means for fixedly mounting one end of the valve on the body, the other end of the valve being movable to and from closing position with respect to said port means, a first lever mounted at one end on the body adjacent one end of the valve, a presser means comprising a flat member supported on said first lever, between the first lever and valve, said flat member being disposed parallel to the valve and movable by said lever toward and away from the valve, means connecting the other end of said first lever to the movable end of the valve to peel said valve progressively from said port means, a second lever mounted on the body, a float connected to one end of said second lever, means for loosely connecting said first and second levers, said latter means being shiftable away from the mounting of said second lever as the valve opens to reduce the mechanical advantage of said second lever.

6. In a valve mechanism, the combination of a valve body having a discharge chamber and comprising a wall, port means in said wall communicating with said chamber, a flexible valve, means for fixedly mounting one end of the valve on the body, the other end of the valve being movable to and from closing position with respect to said port means, a first lever pivotally mounted on the end of the body at which the valve is mounted, a presser means comprising a flat member supported on said first lever, between the first lever and valve, said flat member being disposed parallel to the valve and movable by said lever toward and away from the valve, means connecting the other end of said first lever to the movable end of the valve to peel said valve, a second lever pivotally mounted on the body adjacent the free end of the valve, extending toward and in overlapping relation with said first lever, said levers having interfitting parts comprising means for loosely connecting said levers and for preventing substantial movement of the levers out of planes which include their respective pivotal axes.

7. In a valve mechanism, the combination of a valve body having a discharge chamber and comprising a wall, port means in said wall communicating with said chamber, a flexible valve, means for fixedly mounting one end of the valve on the body, the other end of the valve being movable to and from closing position with respect to said port means, a first lever mounted at one end on the body adjacent one end of the valve, a presser means comprising a flat member supported on said first lever, between the first lever and valve, said flat member being disposed parallel to the valve anad movable by said lever toward and away from the valve, means supported by the other end of the lever for connecting it at said other end to the movable end of the valve to peel said valve, a second lever mounted on the body and extending toward and in lateral, overlapping relation with said first lever, the overlapping end of said second lever having a slot, said connecting means including a pivot means formed and disposed to enter said slot for connecting said levers.

8. In a valve mechanism, the combination of a valve body having a discharge chamber and comprising a wall, port means in said wall communicating with said chamber, a flexible valve, means for fixedly mounting one end of the valve on the body, the other end of the valve being movable to and from closing position with respect to said port means, a first lever, comprising parallel, coextensive arms, pivotally mounted at one end on the body adjacent the valve mounting means, a presser means comprising a flat member supported on said first lever, between the first lever and valve, said flat member being disposed parallel to the valve and movable by said lever toward and away from the valve, means connecting said arms at the other end to the movable end of the valve to peel said valve progressively from said port means, a second lever mounted on the body adjacent the movable end of the valve and extending between said arms for guiding the levers, means for connecting the guided ends of said levers and a float connected to the other end of said second lever.

9. In a valve mechanism, the combination of a valve body having a discharge chamber and comprising a wall, port means in said wall communicating with said chamber, a flexible valve, means for fixedly mounting one end of said wall and extending over said port means, the other end of the valve being movable, a lever pivotally mounted on the body at the end of the wall adjacent the mounting of said valve and extending substantially parallel to the valve but spaced therefrom, means connecting the other end of said lever to the free end of the valve, a presser member having an area sufficient to substantially cover the port means, means for mounting the member on said lever between it and the valve, means for guiding the end of the lever for movement in a planar path, and means for actuating said lever in opposite directions to cause it to lift the presser member and to peel the valve from the port means and to restore the valve to the port means and apply the presser member to the valve to forcibly seat it on the port means.

10. In a valve mechanism, the combination of a valve body having a discharge chamber and comprising a wall, port means in said wall communicating with said chamber, a flexible valve, means for fixedly mounting one end of the valve on the body adjacent one end of said wall and extending over said port means, a lever pivotally mounted on the body at the end of the wall adjacent the mounting of said valve and extending substantially parallel to the valve but spaced therefrom, a link pivotally connected to the lever and the movable end of the valve, and means for actuating said lever and link to peel the valve from the port means.

11. In a valve mechanism the combination of a valve body having discharge chamber and comprising a wall, port means in said wall communicating with said chamber, a flexible valve, means for fixedly mounting one end of the valve on said body, the other end of said valve being movable to and from closing position with respect to said port means, a first lever comprising parallel coextensive elements, said first lever being mounted at one end on the body adjacent one end of the valve and having the elements closely spaced and disposed adjacent the other end of the valve, means connecting the lever at the other end to the movable end of the valve to peel said valve progressively from said port means, a second lever mounted on the body, a float connected to one end of said second lever, the other end of said second lever entering between said elements of the first lever for guidance thereby, and means connecting said levers so that the second lever will operate the first.

12. In a valve mechanism, the combination of a valve body having a discharge chamber and comprising a wall, port means in said wall communicating with said chamber, a flexible valve, means for fixedly mounting one end of the valve on the body, the other end of the valve being movable to and from closing position with respect to said port means, a first lever comprising parallel, closely spaced, coextensive elements, said first lever being mounted at one end on the body adjacent one end of the valve and having the other end disposed adjacent the movable end of the valve, means connecting said other end of the lever to the movable end of the valve to peel said valve progressively from said port means, a second lever mounted on the body, a float connected to one end of said second lever, the other end of said second lever having an elongated opening and entering between said elements for guidance thereby, means for connecting said levers, said lever connecting means being shiftable in the opening with respect to said second lever to vary the mechanical advantage of said second lever.

References Cited in the file of this patent

UNITED STATES PATENTS

| Number | Name | Date |
|---|---|---|
| 70,511 | Bourden | Nov. 5, 1867 |
| 212,556 | Johnson | Feb. 25, 1879 |
| 576,601 | Montague | Feb. 9, 1897 |
| 874,523 | Meagher | Dec. 24, 1907 |
| 932,172 | Porter | Aug. 24, 1909 |
| 934,045 | Cotter | Sept. 14, 1909 |
| 1,059,490 | Schulte | Apr. 22, 1913 |
| 1,119,291 | Lawrence | Dec. 1, 1914 |
| 1,138,994 | Steele | May 11, 1915 |
| 1,409,550 | Jennings | Mar. 14, 1922 |
| 1,576,709 | Bassler | Mar. 16, 1926 |
| 2,000,883 | Cullen | May 7, 1935 |
| 2,180,173 | Share | Nov. 14, 1939 |
| 2,216,000 | Crawford | Sept. 24, 1940 |
| 2,328,323 | Bowers | Aug. 31, 1943 |

FOREIGN PATENTS

| Number | Country | Date |
|---|---|---|
| 508,734 | Germany | 1930 |
| 536,543 | Great Britain | 1941 |